March 26, 1935.    H. HUEBER    1,996,019
WINDSHIELD HEATER
Filed May 16, 1932    2 Sheets-Sheet 1

INVENTOR
BY *Henry Hueber,*
*Bean & Brooks.* ATTORNEYS

March 26, 1935.  H. HUEBER  1,996,019
WINDSHIELD HEATER
Filed May 16, 1932   2 Sheets-Sheet 2
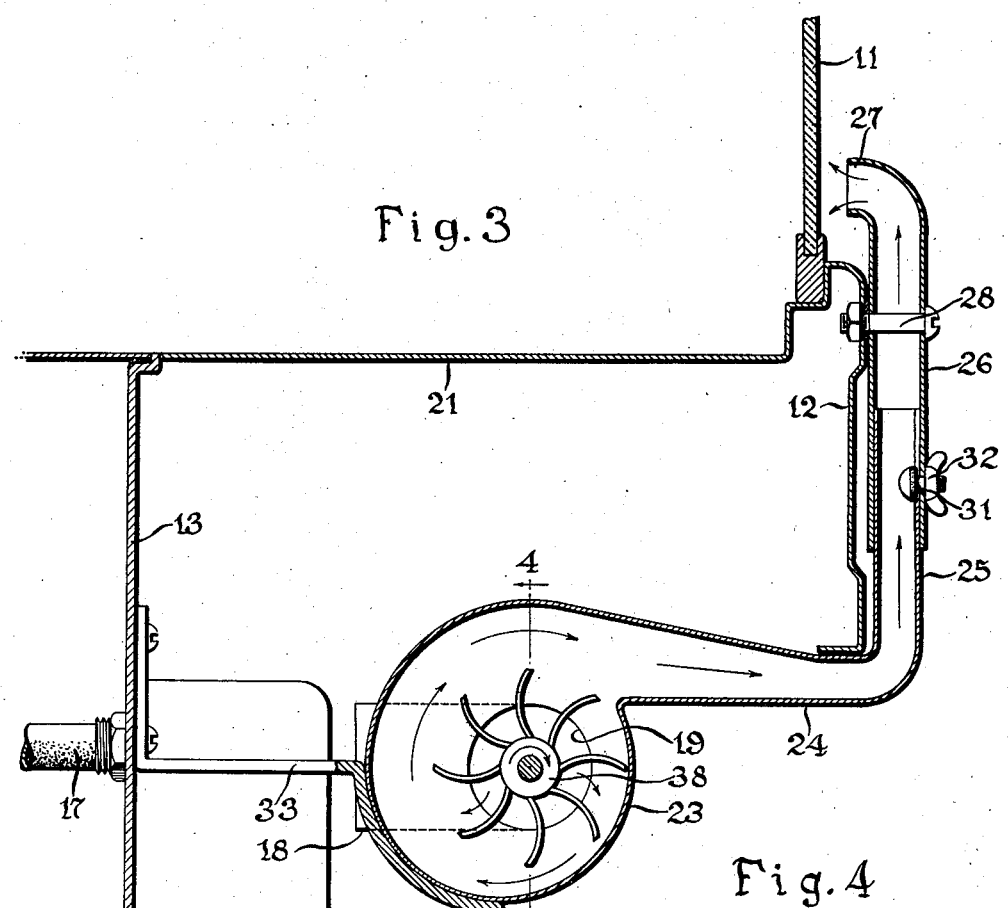
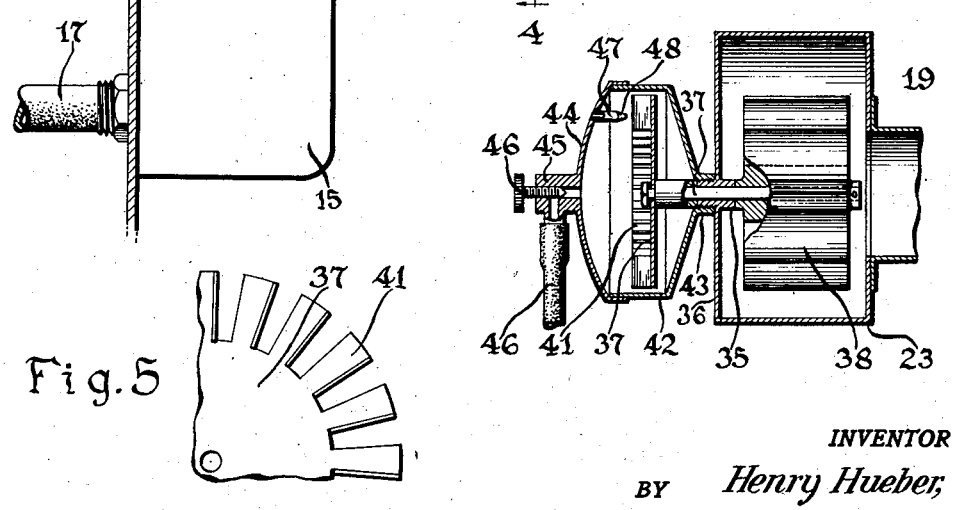
INVENTOR
BY *Henry Hueber,*
*Bean & Brooks.* ATTORNEYS Patented Mar. 26, 1935

1,996,019

UNITED STATES PATENT OFFICE 1,996,019

WINDSHIELD HEATER

Henry Hueber, Buffalo, N. Y., assignor to Trico Products Corporation, Buffalo, N. Y.

Application May 16, 1932, Serial No. 611,743

4 Claims. (Cl. 20—40.5)

This invention relates to means for preventing the collection or accumulation of ice, snow, or sleet upon the windshields of automobiles, boats and other motor vehicles, by projecting heated air against the windshield glass.

In the operation of vehicles during cold weather, ice, snow and sleet frequently accumulate on the vehicle windshields, impairing the operator's vision therethrough. As it has been found that the usual windshield cleaners of the wiper type cannot alone clear the windshields of such accumulations, proposals have been made to convey heat from the vehicle engines to the windshields to sufficiently melt the frozen deposits that the windshield wiper can remove them.

Heretofore, the devices developed for this purpose have comprised conduits extending from the engine compartment into adjacency with the windshield for conveying heated air or gases from the engine and discharging it against the windshield, necessitating that openings be cut through the engine hood, or walls of the vehicle body, for passing the conduit.

The present invention comprehends a device, attachable to the inside of the vehicle body or incorporated in the construction of the latter, for receiving air heated by a radiator or heater within the body, and for discharging such air, under pressure, against the windshield, for heating the latter and thereby melting or preventing accumulation of frozen moisture. More especially, the device includes a blower, operable by suction maintaining in the air or fuel intake of the engine, for enforcing the flow of heated air through a conduit extending entirely within the vehicle body from the heater to the portion of the windshield in front of the operator. The parts of the conduit are adjustable to enable installation of the device in different kinds of vehicles having different internal dimensions.

These and other objects and advantages will appear from the following description of the typical embodiment of the invention illustrated in the accompanying drawings, wherein:

Fig. 3 is a vertical sectional view of the device and the adjacent portions of a vehicle;

Fig. 4 is a section taken along line 4—4 of Fig. 3; and

Fig. 5 is a fragmentary elevation of one of the parts shown in Fig. 4.

Figure 1:
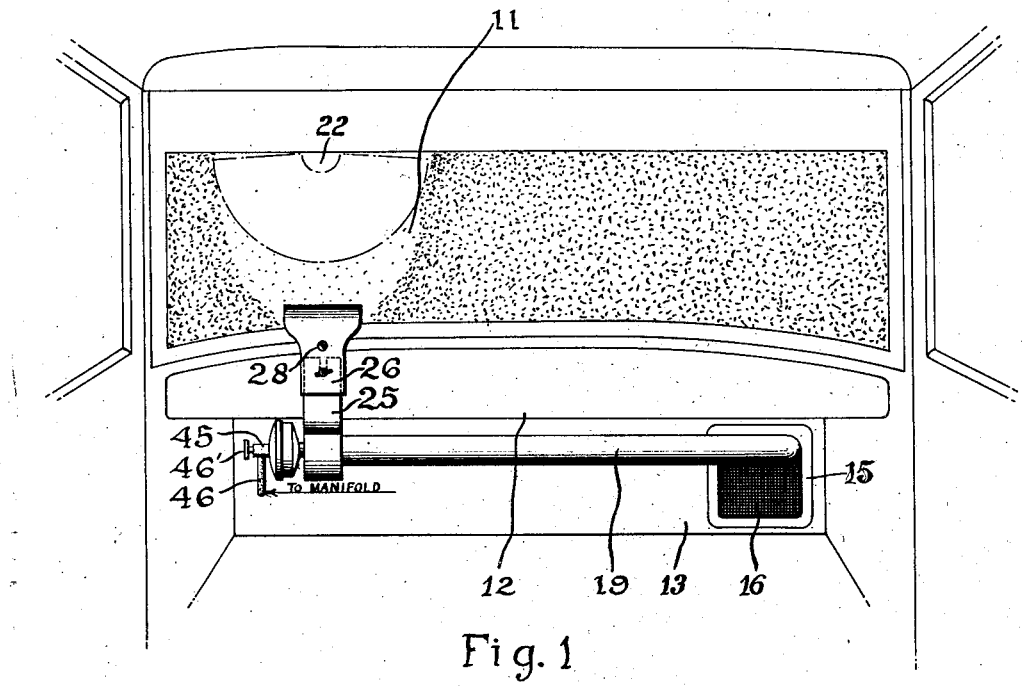
Fig. 1 is a front elevation of the device, showing it installed in the interior of the body of a motor vehicle.
Figure 2:
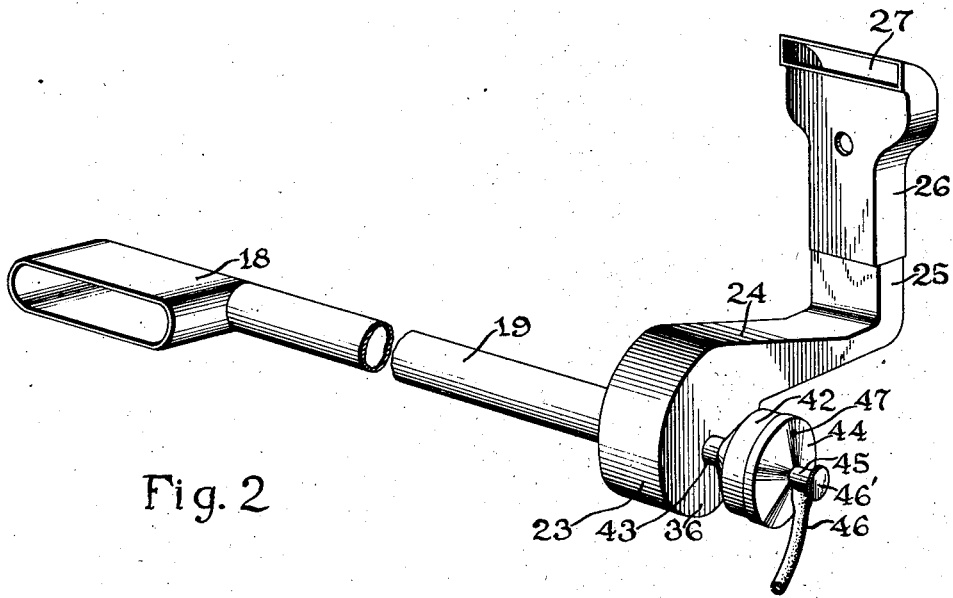
Fig. 2 is a perspective of the device, viewing it from the rear.

As shown in Figs. 1 and 2, the vehicle may have a windshield 11 with a supporting structure or instrument panel 12 therebeneath, and a dashboard 13 disposed below and forwardly of the windshield. Mounted on the dashboard is a heater 15 of any suitable type, the illustrated heater being of the hot water radiator type and comprising a radiator core 16 through which water heated by the vehicle engine (not illustrated) is circulated via conduits 17.

Disposed adjacent to and overlying a portion of the heater 15 is a heated air receiver 18, the same being a terminal portion of a conduit 19. The conduit may extend beneath the vehicle cowl 21 between the dashboard and instrument panel to a point beneath the area of the windshield which is in front of the operator, usually in the path of the windshield wiper, indicated on Fig. 1 at 22. To the latter part of the conduit 19 is affixed a blower casing 23 of substantially cylindrical form and having a tangential tubular extension 24 extending into adjacency with the bottom edge of the instrument panel 12 of the vehicle. A substantially vertical conduit portion 25, preferably of non-circular cross section, comprises a continuation of the extension 24. A bracket 33 connected to the casing 23 may be secured to the dashboard 13 for supporting the conduit.

The receiver 18 is elongated to extend across a portion of the heater 15 and obstruct as little of the effective area of the latter as possible while at the same time it will receive ample volume of the heated air for carriage over to the windshield. Since it is very necessary to heat the windshield glass sufficiently above the freezing temperature, in order to loosen any congealed matter on its exterior side, the receiver 18 is preferably positioned adjacent the top of the heater 15 for receiving the air which passes over that portion of the core 16 which is most intensely heated. This also leaves the remaining portion of the core which is less highly heated exposed for the comfort of the occupants of the car.

Telescoped over the conduit portion 25, and coaxial therewith, is a tubular member 26 having a discharge opening 27 at its upper end for directing fluid against the windshield. A fastener 28 secures the member 26 to the instrument panel 12. A vertical slot 29 is formed in the upper end of conduit portion 25 and a registering aperture 31 is provided in member 26. A fastener 32, extended through the slot and aperture, serves to secure the conduit portion 25 to member 26. By reason of this mode of connection the device may be readily adjusted to the dimensions of various kinds of vehicles.

A bearing 35 extends through the wall 36 of the casing 23 opposite the conduit 19, and is in substantially axial alignment with the latter. Journalled in the bearing is a shaft 37 having one end extended into the casing 23. A blower 38, disposed within the casing is mounted upon the shaft, and, while any suitable type of blower may be used, the multiple blade centrifugal type illustrated is preferred. To the opposite end of the shaft a turbine wheel 39 is affixed, the wheel having about its periphery a plurality of struck out inclined blades 41.

A casing section 42, having a reduced tubular portion 43 telescoped over bearing 35 and abutting the blower housing 23, extends about the turbine wheel 39. Secured to casing section 42 is a flanged cover plate 44 carrying a tubular fluid outlet fitting 45. The latter connects to a hose or conduit 46 leading to the intake manifold of the vehicle engine or other suitable source of less-than-atmospheric pressure. A screw valve 46' threaded into the tubular fitting 45, is adjustable to vary or stop the flow of fluid through the fitting and through conduit 46.

Secured to the cover 44 is discharge nozzle 47, open to the atmosphere and so disposed relative to the turbine wheel 39 that fluid ejected from the discharge end 48 of the nozzle will impinge against the turbine blades 41 to effect rotation of the turbine wheel.

When not in use, the screw valve 46 is closed so that the device is inoperative. When the vehicle is being operated under such conditions that ice, sleet or snow have collected upon the windshield or threaten to do so, the valve 46 may be opened. Thereupon, the intake manifold or other source of suction will withdraw air from the interior of the turbine casing 42, via fitting 45 and conduit 46, to reduce the pressure within the turbine casing below the pressure of the atmosphere.

Atmospheric air will flow through the nozzle 47 and impinge upon the turbine blade 41 to rotate wheel 39, shaft 37 and blower motor 38. The latter, by centrifugal action, will cause air heated by the heater 15 to enter the receiver 18 and flow through conduit 19, and will discharge the heated air, through conduit sections 25 and 26, and opening 27, against the windshield 11. The discharged heated air will rise upwardly along the inner surface of the windshield and will heat the latter so that ice, snow or sleet on the outer surface will be melted and will either drain away or be wiped away by a windshield wiper, thus clearing the windshield, or at least that portion of it directly in front of the operator.

It will be understood that any heat, residual in the air discharged against the windshield, which is not utilized in heating the windshield and melting frozen deposits thereon, will be carried to other parts of the vehicle interior by convection, so that it will not be wasted. It will be understood further that the device herein described and illustrated is merely illustrative of one embodiment of the inventive principles involved, and that the latter may be utilized in devices having other structural characteristics and arrangements, all within the purview of this invention.

What is claimed is:

1. A windshield heater comprising, in combination with means for supplying warm air, a body provided with a passage therethrough, one end of the passage being disposed to receive warm air from said supply means, a distributor nozzle separate and distinct from the body, means securing the nozzle to the windshield for discharging warm air thereover, and means detachably connecting the nozzle to the body to receive warm air from its passage and to support the body from the windshield supported nozzle whereby when said detachable means is rendered inoperative said body may be removed from the nozzle.

2. In combination with a vehicle having a passenger compartment with a windshield and an internal combustion engine, said engine having an intake manifold, a heater in said compartment deriving its heat from said engine, a conduit in said compartment having one end open and disposed to receive air from said heater, and the other end of the conduit being open and positioned adjacent the windshield for discharging air thereagainst, and a blower in said conduit for drawing air from the heater and enforcing its flow through the conduit.

3. A windshield heater for a motor vehicle having a heater therein to warm the passenger compartment of the vehicle, comprising a conduit, means on one end of said conduit for receiving a portion of the heated air output from the heater, the other end of said conduit being adapted to direct the received heated air against the windshield, and means interposed in said conduit for drawing heated air from the heater and discharging it against the windshield.

4. In combination, a heater for the passenger compartment of a vehicle, a windshield heater comprising a conduit having a collector end disposed adjacent the compartment heater for receiving warm air therefrom and a distributor end disposed to discharge the collected warm air over the windshield, and air flow creating means carried by the conduit for inducing an inflow of air at the collector end and a discharge from the distributor end.

HENRY HUEBER.